United States Patent [19]

Darwen et al.

[11] Patent Number: 5,246,984
[45] Date of Patent: Sep. 21, 1993

[54] WATER DISPERSIBLE POLYAMINE-EPOXY ADDUCT AND EPOXY COATING COMPOSITION

[75] Inventors: Stuart P. Darwen, Manchester; Daniel A. Cornforth, Rochdale, both of England

[73] Assignee: Air Products and Chemicals, Inc., Allentown, Pa.

[21] Appl. No.: 893,151

[22] Filed: Jun. 3, 1992

[51] Int. Cl.$^5$ ............................................... C08K 3/20
[52] U.S. Cl. ...................................... 523/404; 528/93
[58] Field of Search ........................... 523/404; 528/93

[56] References Cited

U.S. PATENT DOCUMENTS

| | | |
|---|---|---|
| 3,449,281 | 6/1969 | Sullivan et al. |
| 4,246,148 | 1/1981 | Shimp et al. ..................... 523/400 |
| 4,501,832 | 2/1985 | Albers et al. .................... 523/414 |
| 4,992,516 | 2/1991 | Schipfer et al. ................. 525/526 |
| 5,087,647 | 2/1992 | Flakus ............................. 523/412 |

Primary Examiner—Melvyn I. Marquis
Assistant Examiner—D. Aylward
Attorney, Agent, or Firm—Russell L. Brewer; James C. Simmons; William F. Marsh

[57] ABSTRACT

This invention relates to a water compatible polyamine-epoxy adduct formed by the reaction of a polyamine with a mixture of a monoepoxide and polyepoxides, the monoepoxide being added in an amount to react with about 10 to 50% of the primary amino groups in said polyamine and the polyepoxides being added in an amount to react with from about 35 to 65% of the remaining primary amino groups.

This invention also contemplates a water dispersible blend resin as an amine salt and comprises a water compatible polyamine-epoxy adduct and a resin compatible polyamine-epoxy adduct wherein the water compatible polyamine-epoxy adduct is as described above and the resin compatible polyamine-epoxy adduct is formed by reacting a polyamine with an aromatic monoepoxide, said aromatic monoepoxide reacted in an amount to provide from about 0.4 to 1 equivalents epoxide per primary amino group.

The invention also pertains to a two component water epoxy coating composition comprising an aqueous dispersion of a blend of a water compatible polyamine-epoxy adduct, a resin compatible-polyamine-epoxy adduct and a polyepoxide resin emulsified therewith wherein the amount of polyepoxide resin in the coating composition is such that there is from about 0.5 to 1.5 equivalents epoxide per active hydrogen equivalent.

5 Claims, No Drawings

WATER DISPERSIBLE POLYAMINE-EPOXY ADDUCT AND EPOXY COATING COMPOSITION

FIELD OF THE INVENTION

This invention pertains to water dispersible polyamine-epoxy adducts which can be used as a curative for both liquid and solid epoxy resin systems and to the resulting epoxy coating systems.

DESCRIPTION OF THE PRIOR ART

Polyepoxide coating systems cured with polyamine-epoxy adducts curatives are known and have been widely used for the preparation of industrial maintenance coatings and other types of protective coatings for a variety of substrates. Polyepoxide resins have excellent resistance to chemicals also have excellent adhesion to most substrates, e.g. various woods, wallboard, metals and masonry surfaces.

Due to more stringent environmental regulations, particularly with respect to reduced voaltile organic compounds (VOC), toxicity, etc. aqueous based coating systems are receiving significant attention in terms of research and development efforts. Aqueous polyepoxide coating systems based upon polyamine-epoxy adducts are known but there have been many problems associated with these systems. For example, many of the aqueous dispersions have an extremely high viscosity at high solids level thus making them difficult to apply and process. Many aqueous dispersions have an inability to properly wet the substrates to form continuous coatings and to adhere to the surface of the substrates. Potlife of the epoxy coating compositions has been short in duration and may not be used for many industrial applications when the aqueous dispersion is mixed with a solid or liquid epoxy resin. Other problems will become apparent through a review of several patents disclosing aqueous polyamine-epoxy adducts. Some of these patents disclosing polyamine-epoxy adducts as curatives for polyepoxide resins include the following:

U.S. Pat. No. 4,246,148 discloses a two part aqueous coating composition based upon a polyamine-epoxy adduct and a polyepoxide. The aqueous coating compositions are alleged to have excellent cure times, low viscosity, excellent particle size for providing gloss and blush resistance and excellent pot life. The polyamine-epoxy adduct is formed by reacting a polyamine with a polyepoxide resin in a molar ration of 1-10 moles polyamine per epoxide equivalent to form a polyamine terminated epoxy adduct. Free polyamine is removed and then the polyamine-epoxy adduct is endcapped with a monoepoxide having from about 9 to 16 carbon atoms, the monoepoxide being added in sufficient amount to eliminate the presence of primary amines. A portion of the remaining amine hydrogen atoms then are reacted with a salt forming component and volatile organic or inorganic acid to enhance water solubility. The polyamine-epoxy adduct is emulsified in water and combined with a solid or liquid emulsion of epoxide resin and the resultant polyepoxide system cured.

U.S. Pat. No. 5,087,647 discloses an aqueous two component system based upon epoxy resins and diamines which are suited for use as coatings, etc. One component comprises a curing agent or hardener for the epoxide resin and it is comprised of a curing agent consisting of a homogeneous solution of polyamine in water and an epoxide resin component consisting of a polyglycide of bisphenol or aliphatic polyol including polyether polyols and a polyacrylate of a polyol including polyacrylates of polyether polyols. An example shows an epoxide resin of a diglycidyl ether of bisphenol A, and bisphenol F; trimethylolpropane triglycide and tripropylene glycol diacrylate. This epoxide resin then is mixed with the polyamine and the resulting formulation cured.

U.S. Pat. No. 4,501,832 discloses a water reducible coating composition which comprises a modified polyamine resin reduced in an aqueous system comprising water and a low molecular weight nitroparaffin. In the prior art section, the patentees point out that two component amino-epoxy coating systems have been considered for high performance, ambient temperature curing, on water borne systems. But, such systems have not been directly water reducible. One type of water borne amino-epoxy system includes aminofunctional curing agents which are neutralized by acids to form salts and aminofunctional curing agents which are chemically modified with hydrophilic ether groups so that they can be water reduced and emulsified. The modified polyamines are formed by reacting polyamines with glycidyl ethers, e.g., monoepoxides and diepoxides and mixing these systems with a nitroparaffin such as nitromethane.

U.S. Pat. No. 3,449,281 discloses water dispersible epoxy compositions incorporating water soluble resins and non-soluble resins which are suited as coating compositions. The water soluble resins are modified epoxy-amine adducts and they are prepared by reacting a polyamine with an epoxy reactant at less than a stoichiometric quantity of an amine to epoxy reactant. This adduct having an epoxy-amine reaction group is subsequently solubilized by forming the corresponding acid salt. This adduct then is mixed with a conventional polyepoxide. emulsified in water and the resulting system cured.

U.S. Pat. No. 4,992,516 discloses a paint binder based upon epoxy resin/amine adducts modified to include diamine bridges. In preparing the composition a diprimary aliphatic polyamine is reacted with an aliphatic monoepoxide compound in an amount to yield a product having two secondary amino groups. This product then is reacted with less than stoichiometric quantity of diglycidyl compound. Then this mixture is reacted with a mixture of a polyepoxy resin and primary tertiary diamines and a primary secondary alkanolamines to form an epoxy resin/amine adduct free from epoxide groups. This product then is neutralized with carboxylic acid to form a water dilutable system.

SUMMARY OF THE INVENTION

This invention relates to water compatible polyamine-epoxy adducts, and to curable coating compositions comprising a blend of polyamine-epoxy adducts, generally, partially in the amine salt form and a polyepoxide. The polyamine-epoxide adduct comprises a blend of a water compatible resin and a resin compatible resin, with the amino groups partly converted to an amine salt. The water compatible polyamine-epoxy adduct is prepared by reacting a polyamine with a monoepoxide and one or more polyepoxides in an amount such that from about 10 to 50% of the primary amino hydrogen atoms are reacted with the monoepoxide and 5 to 65% of the primary amino hydrogens are reacted with the polyepoxide. The resin compatible polyamine-epoxide adduct is formed by reacting an aliphatic or cycloaliphatic polyamine with a monoepoxide in an amount to convert 30 to 70% of the primary amino groups. The water compatible and resin compatible polyamine-epoxy adducts then are mixed to form a blend and then the amino groups remaining in the water and resin compatible polyamine-adducts are reacted with formaldehyde to form methylolated derivatives. The amount of formaldehyde to be used for methylolation should be sufficient to react with at least 25% of the available amine functionality in the blend of the water compatible and resin compatible polyamine-epoxy adducts. Once methylolated, an acid is added to the blend to partially convert the amino groups in the blend to an amine salt. The resulting blend then is readily dispersible in water and is capable of dispersing liquid and solid polyepoxide resins in water.

The polyamine-epoxy adduct containing blend then is mixed with a polyepoxide resin to form a creamy emulsion which is capable of being thinned with water, coated onto a substrate and cured.

There are several advantages associated with the polyamine-epoxide adducts and the water dispersible hardeners of this invention and these advantages include:

- an ability to generate water dispersible epoxy resin coating systems having a solids content of at least 70% by weight in water without the use of organic solvents;
- an ability to produce epoxy resin systems having excellent pot life and capable of yielding surface coatings having excellent gloss, hardness and chemical resistance;
- an ability to generate epoxy coating compositions having excellent mechanical stability and which are capable of being applied as a film to provide excellent film continuity, flexibility chip resistance and the like;
- an ability to formulate readily water dispersible epoxy resin coating compositions and eliminate the presence of expensive organic solvents which contribute to organic pollution of the environment on curing; and
- an ability to formulate readily water dispersible epoxy resin coating compositions which are fast drying, stable at high dilution, and have rapid hardness buildup.

DETAILED DESCRIPTION OF THE INVENTION

In contrast to many of the prior art techniques for producing water dispersible epoxy resin coating compositions, this invention relies on the formulation of a blend comprising a water compatible polyamine-epoxy adduct and a resin compatible polyamine-epoxy adduct such that when blended together the resulting blend is readily water dispersible. Typically, the blend is dispersible in an amount exceeding 70% by weight in water. Dispersion in the water can be achieved without the addition of organic solvents, thus enhancing the utilization of the polyamine-epoxy adduct as a curative for epoxy resin systems and thus eliminating residual environmental pollution due to the presence of fugitive organic components.

The water compatible polyamine-epoxy resin is formulated by reacting a polyamine with a mixture of epoxide resins consisting essentially of monoepoxide and polyepoxide. The polyamines suited for preparing the water compatible polyamine-epoxy adduct are ones that typically contain from about 2 to 20 carbon atoms per molecule and have from 2 to 10 amine nitrogen atoms. Preferably, the amine has from about 3 to 6 nitrogen atoms with two of the nitrogen atoms being primary amine nitrogen atoms. Particularly suited for producing the water compatible polyamine-epoxy adduct are the polyalkylene polyamines and preferably the polyethylene polyamines represented by the formula:

H$_2$NR—[NHR]$_n$—NH$_2$ where n is an integer from 0 to about 6 and R is an alkylene group, preferably C$_{2-3}$ alkylene. Examples of alkylene polyamines include ethylene diamine, diethylenetriamine, triethylenetetramine, tetraethylenepentamine, pentaethylenehexamine, dipropylenetriamine, tripropylenetetramine and tributylenetriamine. Other polyamines include the aminopropylated polyamines which can be formed by the reaction of a polyamine, polyol or alkanolamine with acrylonitrile and the subsequent reduction of the cyano group to the primary amine. The polyamines suited for aminopropylation include the polyalkylene polyamines such as those described above. Examples of polyols suited for aminopropylation include polyols having from 2 to 6 carbon atoms and from 2 to 4 hydroxyl groups such as ethylene glycol, propylene glycol, trimethylolpropane, and pentaerythritol. Alkanolamines are those of similar carbon content to the polyols and have both amine and hydroxy functionality. Examples include ethanolamine and diethanolamine. Conversion of the cyano group to the amine group can be carried out in conventional manner by contacting the cyanoethylated polyamine or polyol with hydrogen in the presence of a hydrogenation catalyst such as a Raney nickel or palladium catalyst metal carried on a support such as silica, diatonaceous earth, carbon, alumina and the like. Examples include bis(3-methoxypropyl)amine and bis(aminoproxyethoxypropyl)amine.

The polyamine used in forming the water compatible polyamine-epoxy adduct is reacted with a monoepoxide in an amount to endcap from 10 to 50%, preferably 20 to 40% of the primary amino hydrogen atoms in the polyamine (calculated basis). The monoepoxides are compounds having from 7 to 21 carbon atoms and they can be aliphatic or aromatic. Typically, the aliphatic monoepoxides are used and examples include alkyl glycidyl epoxides, glycidyl ethers, glycidyl esters represented by the formulas:

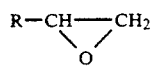

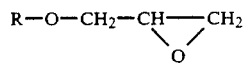

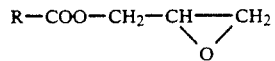

wherein R is an aliphatic group having from 4 to 18 carbon atoms, preferably 4 to 14 carbon atoms or the R group may be an aromatic group. Specific examples of monoepoxides suited for reaction with the polyamine to form the polyamine-epoxy adduct include butyl glycidyl ether, phenyl glycidyl ether, dodecyl glycidyl ether; cyclohexene vinyl monoepoxide, pinene oxide;

glycidyl esters of tert-octanoic acid, glycidyl esters of acrylic acid, tert-nonanoic acid and tert-decanoic acid and glycidyl ethers of etheralcohols such as ethoxyethanol. Generally, at least a portion, e.g., 40% of the monoepoxide, is an aliphatic epoxide.

In addition to the monoepoxide used as an endcapping agent for a portion of the amino primary hydrogen atoms, polyepoxides are added for the purpose of chain extending the polyamines and further reacting with amino hydrogen atoms contained in the polyamine. The polyepoxide suited for reaction with the polyamine may be an aliphatic polyepoxide, such as the di or polyglycidyl ethers of aliphatic polyols and aromatic polyols. A small proportion of aliphatic diepoxide having an epoxide equivalent weight of from 120–140 is preferred as a component of the polyepoxide as it tends to impart reduced viscosity to the system. Levels of from 0.5 to 2 epoxide equivalents aliphatic diepoxide per epoxide equivalent polyepoxide are preferred. Examples of aliphatic di- and polyepoxides include butanediol diglycidyl ether, hexanediol diglycidyl ether, and glycerol triglycidyl ether. Examples of polyepoxides of aromatic polyols include the polyglycidyl ethers of bisphenol A and bisphenol F resins, e.g., those obtained by the condensation of bisphenol A with epichlorohydrin or by the condensation of a bisphenol-F polyol (formed by reacting phenol with formaldehyde) with epichlorohydrin. Other candidates include the reaction of epichlorohydrin with phenol and cresol-formaldehyde condensates.

The level of monoepoxide and polyepoxide used in the conversion of the polyamine to form the water compatible polyamine-epoxide adduct is one factor in obtaining a desired pot life for the polyamine-epoxy adduct. If a long pot life is required for the polyamine-epoxy adduct, a greater proportion of the primary amino hydrogens, and possibly secondary amine hydrogen atoms, in the polyamine-epoxy adduct are converted or capped by the epoxy group. On the other hand, if a shorter pot life period can be tolerated, then lesser quantities of the primary amino hydrogens may be reacted with the monoepoxide and di or polyepoxide. Typically from about 10 to about 50% (calculated basis) of the available primary amine functionality in the polyamine is endcapped with the monoepoxide and from about 5 to 65% (calculated basis) of the available primary amine functionality is encapped by the aliphatic or aromatic polyepoxide. Generally, the ratio of monoepoxide to aliphatic or aromatic polyepoxide should be from 0.25 to 4 epoxide equivalents of monoepoxide per 1 equivalent polyepoxide. Even though broadly from about 35% of the primary amine hydrogen functionality may be converted by reaction with the aliphatic or aromatic polyepoxide and lesser quantities of monoepoxide may be used, it is preferred that the monoepoxide be used in greater proportion than the aliphatic or aromatic polyepoxide.

The second component of the blend of the water dispersible blend of polyamine-epoxy adducts is a relatively resin compatible polyamine. It is derived by reacting a polyamine with an epoxy compound. The polyalkylene polyamines used for forming the water compatible polyamine-epoxy adduct can be used in forming the resin compatible polyamine-epoxy adduct. The shorter chain analogues are preferred. Other polyamines such as cycloaliphatic polyamines may be used. Examples of cycloaliphatic amines suited for forming resin compatible polyamine-epoxy adducts include isophoronediamine, cyclopentanediamine, cyclohexanediamine, m-xylylenediamine and di(4-aminocyclohexyl)methane. Preferably, the polyamine used in forming the resin compatible polyamine-epoxy adduct is a polyethylene polyamine.

The resin compatible polyamine-epoxy adduct is formed by reacting the polyamine with a polyepoxide or a monoepoxide or polyepoxide in sufficient amount such that from about 40 to 100% of the available or remaining primary amine functionality in the polyamine are reacted. The monoepoxides and polyepoxides used for formulating the water compatible polyamine-epoxy adduct also may be used in preparing the resin compatible polyamine-epoxy adduct. Preferably, aromatic monoepoxides are used and these include phenyl glycidylether and the glycidylether of cresol.

The water dispersible blend is formulated by mixing the water compatible polyamine-epoxy adduct with the resin compatible polyamine-epoxy adduct in a weight ratio of from about 0.25 to 4 weight parts water compatible polyamine-epoxy adduct to 1 weight part resin compatible polyamine-epoxy adduct To facilitate dispersibility of the blend of water compatible polyamine-epoxy adduct and resin compatible polyamine-epoxy adduct, the blend is contacted with formaldehyde under conditions sufficient to methylolate at least 25% of the primary amine functionality remaining in the polyamine component of the blend. Preferably from 50 to 100 percent of the amino hydrogen is reacted with formaldehyde. To this methylolated blend is added a small amount of acid, typically a volatile carboxylic acid to form a partial amine salt. The technique for salt formation of polyamine-epoxy additives is known and typically the level of salting in this process is a function of the desired pot life and cure temperature for the resulting system. Representative volatile acids which can be used for reaction with the amine hydrogen atoms to form the amine salt include organic and inorganic acids. Examples of organic acids that are conventionally used include acetic acid, formic acid, propionic acid, butyric acid and cyclohexanoic acid. Optionally unsaturated acids such as crotonic acid, acrylic acid and methacrylic acid may be used.

The aqueous epoxy coating compositions for application to substrates are formed by dispersing the blend of water compatible and resin compatible polyamine-epoxy adducts with a polyepoxide resin where the polyepoxide resins are present in an amount sufficient to react with the amine hydrogens. Typically, the ratio of polyepoxide to the blend of water compatible polyamine-epoxy adduct and resin compatible polyamine epoxy adduct is such that there is from about 0.5 to 1.5, preferably 0.9 to 1.1, epoxide equivalents per amine hydrogen equivalent. Examples of polyepoxides suited for blending with the aqueous dispersion of water compatible and resin compatible polyamine-epoxy adduct are the solid and liquid aromatic polyepoxides. Examples of these polyepoxides include those having a molecular weight of from 350 to about 1500. Examples of polyepoxide include the glycidyl ethers of bisphenol A, the glycidyl ethers of bisphenol F and the liquid diepoxides of novolac resins.

Other additives and diluents maybe added to the blend to enhance dispersibility of polyepoxide resin to be added. These additives include Pluronic surfactants which include polyether polyols, defoamers, pigments, thixotropes, and so forth. Liquid resins may be diluted with monoepoxides, if desired.

The following examples are provided to illustrate various embodiments of the invention are not intended to restrict the scope thereof.

EXAMPLE 1

Water Compatible Polyamine-Epoxy Adduct

To a suitable reactor equipped with an agitator and reflux condenser there are added 905 weight parts of pentaethylene hexamine (PEHA), 167.5 weight parts of an aliphatic diepoxide having an epoxide equivalent of from 120 to 140 sold under the trademark Epodil 750 and 265 weight parts of butyl glycidyl ether (monoepoxide) sold under the trademark Epodil 741. The level of monoepoxide is calculated to react with 29.7% of the primary amine functionality and the level of aliphatic diepoxide is calculated to react with 23.9% of the remaining amine functionality. Prior to adding the mono and diepoxides, the reactor is purged with nitrogen and the PEHA is heated to a temperature of about 85° to 90° C. Once the PEHA has been heated to 85° to 90° C., the aliphatic diepoxide is added over a period of one hour and subsequently held and the mixture of PEHA and diepoxide reacted for an additional 1 hour. Cooling is required due to the heat generated on reaction of the aliphatic diepoxide with the PEHA. When essentially all of the aliphatic diepoxide is reacted, the butyl glycidyl ether is added over a period of 1½ hours and subsequently reacted for an additional one hour. Then, 572.5 weight parts of a bisphenol A based epoxy having an equivalent weight of between 450-525 is added as a 50% solution in Dowanol PM over a period of 2 to 3 hours and reacted at a temperature of 85° to 90° C. for an additional one hour. After reaction, solvent introduced with the bisphenol A polyepoxide resin is removed by vacuum distillation up to a temperature of about 140° C. Distillation is terminated when the solids content in the mixture is in excess of 96% solids at which time the reactor contents were to a temperature of about 85° to 90° C.

EXAMPLE 2

Preparation of Water Compatible Polyamine-Epoxy Adduct

The procedure of Example 1 is repeated except with the following general exceptions. To a suitable reactor equipped with an agitator and reflux condenser there are added 735 weight parts tetraethylenepentamine (TEPA), 167.5 weight parts of an aliphatic diepoxide having an epoxide equivalent weight of from 120 to 140 sold under the trademark Epodil 750 and 265 weight parts of butyl glycidyl ether (monoepoxide) sold under the trademark Epodil 741. The level of monoepoxide is calculated to react with 29.7% of the primary amine functionality and the level of aliphatic diepoxide is calculated to react with 23.9% of the remaining amine functionality. Prior to adding the diepoxide, the reactor is purged with nitrogen and the TEPA is heated to a temperature of about 85° to 90° C. Once the TEPA has been heated to 85° to 90° C., the aliphatic diepoxide is added over a period of one hour and subsequently held and reacted for an additional 1 hour. Cooling is required due to the heat generated on reaction of the aliphatic diepoxide with the TEPA. When essentially all of the aliphatic diepoxide is reacted, the butyl glycidyl ether is added over a period of 1½ hours and subsequently reacted for an additional one hour. Then, 572.5 weight parts of a bisphenol A based epoxy having an equivalent weight of FROM 450-525 is added AS A 50% solution in Dowanol PM over a period of 2 to 3 hours and reacted at a temperature of 85° to 90° C. for an additional one hour. After reaction, solvent introduced with the bisphenol A polyepoxide resin is removed by vacuum distillation up to a temperature of about 140° C. Distillation was terminated when the solids content in the mixture was in excess of 96% solids at which time the reactor contents were to a temperature of about 85° to 90° C.

EXAMPLE 3

Preparation of Resin Compatible Polyamine-Epoxide Adduct

To a reactor similar to the one described in Example 1, 447 weight parts of diethylenetriamine (DETA) are added. The reactor is purged with nitrogen at which time 753 parts of weight parts of phenyl glycidyl ether are added and the contents heated to a temperature from 55° to 125° C. and reacted for a period of one-half hour. After reaction, the batch is cooled and the resin compatible polyamine-epoxy adduct recovered.

EXAMPLE 4

Preparation of Blend

Water and Resin Compatible Polyamine-Epoxy Adduct

A blend of water compatible-polyamine-epoxy adduct and resin compatible polyamine-epoxy adduct is formed by adding 1740 weight parts of the water compatible polyamine-epoxy adduct of Example 2 and 825 weight parts of a preformed polyamine-adduct of diethylene triamine and phenyl glycidyl ether (Example 3) were added to the reactor. The contents are stirred for about one-half hour. Then, 545 weight parts of an aqueous formaldehyde solution containing 36.6% by weight formaldehyde is added to the reactor for purposes of methylolating the amine hydrogens. After about one-half hour the reactor contents are heated to a temperature of about 95° to 100° C. and held for an additional 1 hour.

Partial conversion of the amino groups of the resulting product to a salt was effected by cooling the reactor contents to a temperature of about 70° to 80° C., followed by the addition of about 516 weight parts water and 74 weight parts acetic acid. One hundred Ten parts of Jeffamine D-230 were added and the batch is adjusted with water to 70% solid content. The reactor contents were stirred for about 1 to 2 hours at such temperature. The batch then was cooled and the product recovered.

EXAMPLE 5

Preparation of Polyepoxide Coating Composition

A series of formulated epoxy coating compositions were prepared using both liquid and solid form bisphenol A type polyglycidyl ether resins emulsified in water cured with the Example 4 blend. Table 1 presents coating compositions and Table 2 presents performance data for the cured coating compositions.

TABLE 1

| Formulation | A | B |
|---|---|---|
| Example 4 | 10 | 2 |
| Epikote 828 | 10 | 0 |
| WJ-3520* | 0 | 10 |

TABLE 1-continued

| Formulation | A | B |
| --- | --- | --- |
| Water | 7 | 25 |

*WJ 3520 ia a commercial solid resin epoxy emulsion.

TABLE 2

| Formulation | A | B |
| --- | --- | --- |
| Pot Life (film) | 1 hr | 6 hr |
| Initial Gloss | 124 | 103 |
| Pendulum Hardness | 142 | 60 |
| Tack free Time | 120 min | 90 min |

EXAMPLE 6

Water Compatible Polyamine-Epoxy Adduct

No Primary Amine Functionality

The procedure of Example 1 is repeated except that 34.9 weight parts of butyl glycidyl ether, 110.5 parts of solid epoxy equivalent weight of from 450 to 525 as a 50% solution in Dowanol PM are reacted with 44.0 weight parts of TEPA in order to ensure there is no remaining primary amine functionality. This product is mixed with the remaining components utilized in Example 2, e.g., to the prepared adduct was added TEPA (96.0 weight parts) followed by addition of Epodil 750 (31.9 weight parts) over 1 hour and further reacted at 85° C. for 1 hour. Epodil 741 (butyl glycidyl ether) (15.8 wt. pts.) was then added over 1 hour at 70° C. and allowed to react further at 70° C. Dowanol PM was then removed by vacuum distillation to a maximum temperature of 140° C. The batch was cooled to 90° C. and 157.6 parts of the product of Example 3 were added. Formaldehyde solution of 36.6% w/w strength (104.2 wt. pts) was added over a 3-hour period and the batch was then heated to 100° C. for 1 hour. Water (98.5 wt. pts) and acetic acid (14.1 wt. pts) were then charged and adjusted to 70% soluds. Jeffamine D-230 (38.9 wt. pts) was added, and the batch was readjusted to 70% solids with water.

The product of this example is compared with the polyamine-epoxy adduct of Example 4 at 70% solids. The results are set forth in Table 3.

TABLE 3

| Formulation | Ex 6 | Ex 4 |
| --- | --- | --- |
| Appearance (70% solids) | Hazy, orange putty | clear, dark orange liquid |
| Viscosity Poise (70% solids) | not measurable | 235 |
| Color (Gardner) | — | 11 |
| Liquid (828) type | No | Yes |
| Solid Resin Emulsion | Yes | Yes |

The water compatible resin of Example 6 will not emulsify a liquid resin of the 828 polyepoxide type but will form an emulsion with a solid resin emulsion. In the latter case using the product of Example 6 a slightly longer pot life and tack free time were observed when compared with the Example 4 blend.

EXAMPLE 7

Comparison with Commercial Systems

The product of Example 4 was compared with an existing commercial water based polyamine adduct. Each product was formulated to give a white water based paint of pigment volume concentration 11%. Film properties were determined for cure of liquid epoxy resins after 7 and 14 days.

|  | EX 4 PRODUCT | COMPETITIVE PRODUCT |
| --- | --- | --- |
| Impact resistance 7 days (cm./kg | 45 | 100 |
| Impact resistance 14 Days (cm./kg | 45 | 55 |
| Elongation by Conical Mandrel (%) 7 Days | 2 | Pass |
| Elongation by Conical Mandrel (%) 14 Days | 2 | 2 |

This data indicates that the competitive product is less than fully cured after 7 days whereas the product of Example 4 has achieved full cure in this period of time.

What is claimed is:

1. A water dispersible polyamine-epoxy adduct formed by reacting a polyamine with a mixture of a monoepoxide and one or more polyepoxides wherein the monoepoxide is added in a proportion to react with from about 10 to 50% of the primary amine groups and the polyepoxides are added in amount to react with from about 5% to 65% of the remaining primary amine groups.

2. The adduct of claim 1 wherein the ratio of monoepoxide to polyepoxide is from 0.5 to 2 epoxide equivalents of monoepoxide per equivalent of polyepoxide.

3. The adduct of claim 2 wherein the polyepoxide is comprised of a mixture of an aliphatic diepoxide or polyepoxide and an aromatic diepoxide or polyepoxide.

4. The adduct of claim 3 wherein the polyamine is a polyalkylene polyamine represented by the formula:

$$H_2NR-[NHR]_n-NH_2$$

where n is an integer from 0 to about 6 and R is an alkylene group.

5. The adduct of claim 2 wherein the monoepoxide is represented by a structural formula selected from the group consisting of:

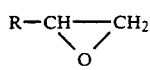

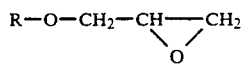

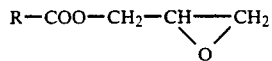

wherein R is an aliphatic group having from 4 to 18 carbon atoms or aromatic.

* * * * *

UNITED STATES PATENT AND TRADEMARK OFFICE
CERTIFICATE OF CORRECTION

PATENT NO. : 5,246,984

DATED : September 21, 1993

INVENTOR(S) : Stuart P. Darwen and David A. Cornforth

It is certified that error appears in the above-identified patent and that said Letters Patent is hereby corrected as shown below:

On the title page, item [75], the second inventor should be "David" A. Cornforth, not Daniel.

Signed and Sealed this

Twenty-sixth Day of November 1996

Attest:

BRUCE LEHMAN

*Attesting Officer*  *Commissioner of Patents and Trademarks*